United States Patent [19]

Susman et al.

[11] Patent Number: 4,542,108

[45] Date of Patent: Sep. 17, 1985

[54] GLASS CAPABLE OF IONIC CONDUCTION AND METHOD OF PREPARATION

[75] Inventors: Sherman Susman, Park Forest, Ill.; Leah Boehm, Jerusalem, Israel; Kenneth J. Volin, Fort Collins, Colo.; Charles J. Delbacq, Downers Grove, Ill.

[73] Assignee: The United States of America as represented by the United States Department of Energy, Washington, D.C.

[21] Appl. No.: 515,835

[22] Filed: Jul. 21, 1983

Related U.S. Application Data

[62] Division of Ser. No. 375,525, May 6, 1982, Pat. No. 4,432,891.

[51] Int. Cl.$^4$ .......................... C03C 3/12; C03C 3/30; H01B 1/10
[52] U.S. Cl. .......................... 501/40; 65/83; 252/518; 429/104; 429/191
[58] Field of Search .............. 65/83; 501/40; 252/518; 429/104, 191

[56] References Cited

U.S. PATENT DOCUMENTS 4,208,474 6/1980 Jacobson et al. .................. 429/191

FOREIGN PATENT DOCUMENTS 36105 9/1981 European Pat. Off. .............. 501/40

OTHER PUBLICATIONS

Susman et al.; "A New Method for the Preparation of Fast Conducting, Reactive Glass Systems", International Conference on Fast Ionic Transport in Solids: ORNL & G.E. Res. & Devel. Center: Gatlinburg, TN, 5/18-22/1981.
Souquet; "Electrochemical Properties of Ionically Conductive Glasses".
Ravaine, D.; "Glasses as Solid Electrolytes", Journal of Non-Crystalline Solids, 38 & 39, (1980), pp. 353-358.
Ribes, M. et al.; "Sulfide Glasses: Glass Forming Region, Structure and Ionic Conduction of Glasses in $Na_2S-XS_2$ (X=Si; Ge); $Na_2S-P_2S_5$ and $Li_2 S-GeS_2$ Systems"; Journal of Non-Crystalline Solids, 38 & 39, (1980), pp. 271-276.

Primary Examiner—Mark L. Bell
Attorney, Agent, or Firm—Hugh W. Glenn; Robert J. Fisher; Judson R. Hightower

[57] ABSTRACT

Sulfide glasses capable of conducting alkali metal ions are prepared from a nonmetal glass former such as $GeS_2$, $B_2S_3$ and $SiS_2$ in mixture with a glass modifier such as $Na_2S$ or another alkali metal sulfide. A molten mixture of the constituents is rapidly quenched to below the glass transition temperature by contact with a metal mold. The rapid quench is sufficient to prevent crystallization and permit solidification as an amorphous solid mixture. An oxygen-free atmosphere is maintained over the mixture to prevent oxidation. A new glass system of (1-X) $Na_2O:XB_2S_3$ is disclosed.

13 Claims, 4 Drawing Figures

GLASS CAPABLE OF IONIC CONDUCTION AND METHOD OF PREPARATION

CONTRACTUAL ORIGIN OF THE INVENTION

The United States Government has rights in this invention pursuant to Contract No. W-31-109-ENG-38 between the U.S. Department of Energy and Argonne National Laboratory.

This is a Divisional of application Ser. No. 375,525, filed May 6, 1982, now U.S. Pat. No. 4,432,891.

BACKGROUND OF THE INVENTION

The present invention relates to a new glass composition characterized by fast ionic transport comtemplated for use as an electrolyte in electrochemical or fuel cells. The invention further relates to a new method of preparing glasses with improved ionic conduction.

Until recently good ionic conductors were selected almost exclusively from crystalline solid electrolytes. For example, sodium-sulfur electrochemical cells often employ sodium $\beta$ alumina as an electrolyte for sodium ion transport. Recently, however, there has been work involving glasses that also exhibit ion conduction. Such glasses may offer the advantages of better mechanical properties and isotropic conductivity when formed into thin sheets or disks for use as solid electrolytes.

A great deal of attention has been given to alkali oxides as network modifiers within oxide glasses. For instance both lithium and sodium oxides have been used as modifiers within silicon oxide networks to form amorphous electrolytes. Unfortunately the binary alkali glasses exhibit relatively low electrical conductivities generally in the range of about $10^{-4}$ to $10^{-6}$ (ohm cm)$^{-1}$ at temperatures of about 300° C. where many of the high specific energy electrochemical cells are operated.

Some improvement in ionic conductivity has been obtained by substituting sulfur for the oxygen within oxide glasses. Sulfide glasses thus prepared are reactive with atmospheric oxygen and thus require special care in preparation and use. In addition, expensive materials such as germanium sulfide have been suggested as the network former in glass systems modified by lithium sulfide and sodium sulfide. Although such glasses present technological advantages in their mechanical properties, their reported conductivities only approach those of the better solid crystalline electrolytes.

Prior methods of preparing a reactive glass that exhibits ionic conductivity involve preparing a powdered mixture of the desired constitutents and sealing the mixture in a vitreous carbon or other high-temperature containment under vacuum. The mixture is melted at 700° to 1000° C. and the glass is formed by immersing the containment in a suitable coolant. Cold water or liquid nitrogen have been suggested as coolants. The glass can be annealed at temperatures typically of about 20-50 degrees lower than the glass transition temperature while sealed in the containment.

SUMMARY OF THE INVENTION

Therefore in view of the above, it is an object of the present invention to provide a new sulfide glass composition capable of ionic conduction of sodium ions.

It is also an object of the present invention to provide an improved method of preparing an electrically conductive reactive glass with increased ionic conductivity.

It is a further object to provide a method of preparing an amorphous solid mixture of a nonmetal sulfide and alkali metal sulfide with an improved cooling technique to prevent crystallization during solidification.

In accordance with the present invention, a glass capable of ionic conduction is provided as an amorphous solid mixture of Na$_2$S and B$_2$S$_3$.

In more specific aspects the conductive glass includes Na$_2$S at about 0.3 to 0.7 mole fraction of the total in mixture with B$_2$S$_3$ and in a preferable mixture Na$_2$S is provided at about 0.5 mole fraction of the total.

A glass as thus provided is intended for use as an electrolyte within an electrochemical cell including a negative electrode that produces sodium ions and a positive electrode capable of producing an anion which will combine with sodium ion in molten mixture. This electrolytic glass conducts sodium ions between the electrodes.

The invention further contemplates an improved method of preparing a sulfide glass capable of ionic conduction. The method involves preparing a molten mixture of a glass network former and a glass network modifier in which the network is a nonmetal sulfide and the modifier is an alkaline metal sulfide. This molten mixture is poured into a mold of sufficient mass and temperature to provide a cooling capacity to supercool the mixture below the glass transition temperature prior to its crystallization. Thus the glass solidifies into an amorphous solid mixture having the improved mechanical properties of glass but yet capable of good ionic conduction.

In more specific aspects of the method, the mold used has a mass of at least 10 times that of the molten glass mixture contained in it for solidification. This rapid cooling for selected glasses can involve cooling from above the freezing temperature to below the glass transition temperature in less than about 1 second at a cooling rate of more than about 500° C. per second.

BRIEF DESCRIPTION OF THE DRAWINGS

The present invention is illustrated in the accompanying drawings wherein.

DETAILED DESCRIPTION OF THE PREFERRED EMBODIMENT

Figure 1:
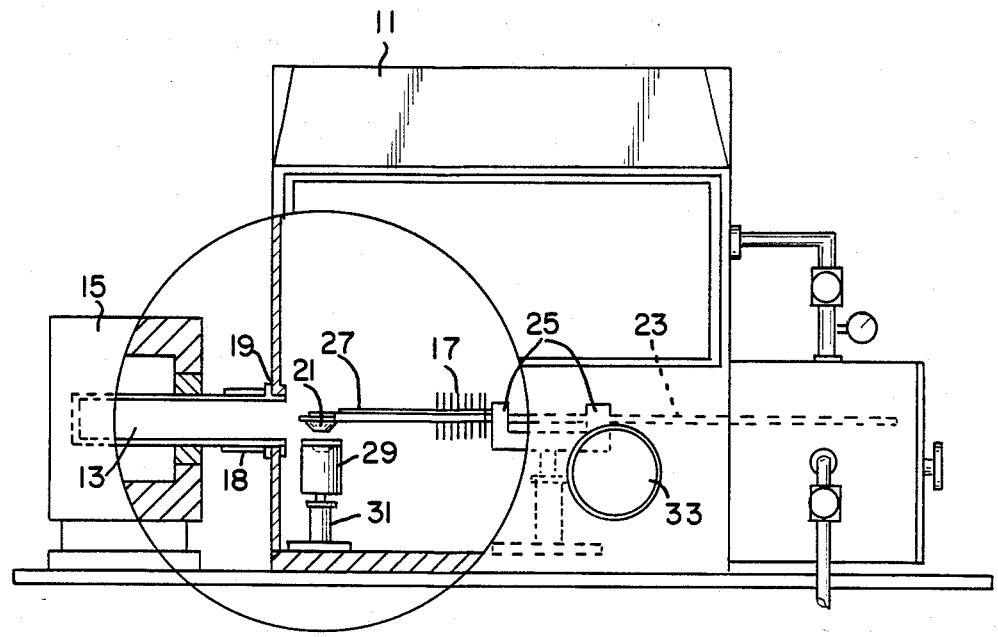
FIG. 1 is a schematic elevation view of an assembly for casting and rapid quenching of fast conducting reactive glass systems.

The new glass composition of the present invention includes an amorphous solid mixture of B$_2$S$_3$ and Na$_2$S. The B$_2$S$_3$ serves as the glass network structure while the Na$_2$S is included at a sufficient level to provide a modified glass capable of conducting sodium ions. The system is conveniently represented as (1 - X) Na$_2$S:XB$_2$S$_3$ where X is mole fraction with $1>X>0$.

Amorphous glass is easily formed at composition rich in sodium sulfide, i.e. more than 0.5 mole fraction Na$_2$S.

For example, 0.60 NaS:0.4 $B_2S_3$ readily forms a glass with a melting point of about 500° C. and a glass transition temperature of about 195° C. However, at lower $Na_2S$ levels approaching 0.3 mole fraction partial crystallization occurs. At higher $Na_2S$ concentration, there may be a decrease in conductivity. As will be seen in FIG. 3 below, the ionic conductivity at a given temperature is lower at 0.6 than at 0.5 mole fraction $Na_2S$. Consequently, a maximum conductivity is indicated in this system at less than 60 mole fraction $Na_2S$. It follows that values of X between about 0.3 and 0.7 advantageously will be selected in this novel glass composition.

It will be clear in reference to the rapid cooling method described herein that the relatively low melting point and glass transition temperature are important and unexpected properties of these novel sulfide glass compositions. The approximatly 500° C. melting point and 200° C. transition temperature compare favorably with the approximately 800° C. and 300° C. corresponding temperatures in the $Na_2S:GeS_2$ system.

It is contemplated that the present new method can be used advantageously to prepare the new novel glass composition disclosed herein as well as various other reactive, fast conductive glass systems. For instance the ionic conductivity of $Na_2S:GeS_2$ glass systems are shown to exhibit improved ionic conductivity through use of the present method. In addition the range of glass formation is found to expand to between 0–0.7 mole fraction $Na_2S$ through use of the present method. It is likewise expected that glasses formed of other networks such as $SiS_2$, in mixture with various alkali sulfides, e.g. sodium sulfide, lithium sulfide and potassium sulfide, will likewise exhibit improved ionic conductivity and other properties through the use of this method.

The method of the present invention is begun by preparing a molten mixture of an alkali metal sulfide and a nonmetal sulfide in a substantially water-free and oxygen-free atmosphere. To prevent reaction with atmospheric oxygen or water the process is carried out in a suitable chamber purged by an inert gas which will not react with the glass constituents at the selected temperatures. For example, nitrogen or helium gas can be used.

For purposes of this application, the term nonmetal sulfide is intended to include sulfides of boron, sulfides of silicon, sulfides of germanium and sulfides of other elements in groups III A, IV A, and V A of the periodic table capable of serving as glass networks.

Glasses are formed from molten mixtures of the desired constituents by solidification under suitable conditions. With some composition an amorphous glass is easily formed. In others including certain of the modified glasses disclosed herein, freezing may begin with at least some crystallization at a temperature above the glass transition temperature. These compositions must be supercooled as liquid at least to the glass transition temperature before crystallization is permitted to occur.

To provide a glass solid from these compositions having this tendency to crystallize, rapid cooling is required. Prior cooling methods often were too slow to form a glassy structure with the desired electrical properties. The method presented herein is capable of supercooling a molten mixture uniformly to below the glass transition temperature in a sufficient time to avoid crystallization and to obtain good ionic conductivity.

The required cooling rates for some glass compositions are beyond the capability of ordinary thermocouple systems and other temperature monitoring devices. For some glasses this entire cooling must occur in less than one second and can involve cooling rates of over 500° C. per second. Therefore, for purposes of this application and the present method the fast cooling rates for alkali metal, modified sulfide glasses are contemplated as being more than about 500° C. per second where required to provide noncrystalline glass solids.

To effect this rapid cooling, the heat released on solidification is removed from the molten glass sample by direct contact with a cool metal mold. The mold can be initially at about ambient temperature but must have sufficient mass and heat capacity such that it will not be heated to above the glass transition temperature during casting. Thus for a stainless steel or other suitable metal mold, the mold mass must be at least ten times or more than that of the glass samples to be solidified.

In one other aspect of the present method, the molten glass is filled into the mold only to a thickness that permits supercooling of the complete casting to below the glass transition temperature prior to crystallization. Typically glass layers or disks of about 1–3 mm thickness are cast and layers of only up to about 1 cm thickness are contemplated for the present fast cooling method.

Referring to FIG. 1, a glovebox and furnace assembly are illustrated by way of example in order to describe the method of this invention. A nitrogen purged glovebox 11 fitted with a seal 19 is coupled to a furnace well 13 that extends into a controlled resistance heated furnace 15. The furnace is selected to expose the interior charge to a temperature typically of 1000° to 1200° C. A radiation and convection shield 17 along with water cooling jacket 18 are illustrated for protecting the glovebox components. Thus, the glovebox temperature is kept to within about 3° C. of outside ambient.

A crucible 21 is mounted on a rod 23 slideably supported on a suitable bushing 25 for inserting and withdrawing the crucible 21 into the furnace well 13. A thermocouple 27 for temperature monitoring is shown on the rim of crucible 21. A mold 29 for receiving the melt is supported on a moveable carrage 31. Also illustrated, is an opening 33 suitable for receiving a sealed glove to permit access by an outside operator.

In preparing an ionic conductive glass, the desired constituents are placed in crucible 21 under a cover of nitrogen gas. The mixture in the crucible is extended into furnace well 13 and exposed to temperatures substantially above the melting temperature of the glass to form a liquid mixture. Crucible 21 is then withdrawn from furnace well 13 by retracting rod 23. Then, at least a portion of the molten mixture is poured into mold 29.

Mold 29 is a suitable material such as stainless steel to be non-reactive with the glass mixture. At ambient temperature, the mold has sufficient mass and heat capacity to rapidly supercool the glass mixture to below the glass transition temperature prior to formation of a crystalline network. With molten glass mixtures of about 800° to 1000° C., it is expected that a stainless steel mold will advantageously have a mass of at least more than 10 times that of the molten glass within the mold. Furthermore, to enhance heat transfer at a suitable fast rate to prevent crystallization, glass layers of less than 1 cm thickness in the mold are advantageously selected. Mold 29 can be provided with shims (not shown) which can be inserted or removed to permit variations in the glass layer thickness as required to ensure sufficient cooling of the layer.

Figure 1A:
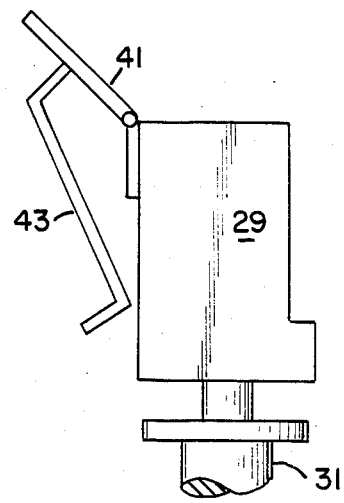
FIG. 1A is an enlarged fragmentary view of one form of a mold used in the FIG. 1 assembly.

FIG. 1A illustrates a mold 29 with a hinged lid 41 and a handle 43. After the molten material is poured into the mold, lid 41 is flipped down to squeeze out the excess melt and increase the cooling rate. In order to relieve stress within the glass and to improve its mechanical properties it can be returned to the furnace for annealing at about 20° to 50° C. below the glass transition temperature.

The following specific examples are presented to further illustrate the present invention.

About 4 grams of sodium sulfide is blended in powder form with an equal molar quantity of $B_2S_3$ and heated under a nitrogen blanket to about 700° C., the melting temperature of the mixture was observed to be at about 500° C. The molten mixture was cast into an approximately 1 cm diameter disk of about 1-2 mm thickness where it was cooled to below its glass transition temperature of 195° C. in substantially less than one second. After an annealing period of approximately 1 hour at about 170° C. the disk shaped sample was placed between blocking electrodes and its impedance measured with a suitable network analyzer at a frequency range of 1 Hertz to 700 kiloHertz at a temperature range of $-50°$ C. to 250° C.

Figure 2:
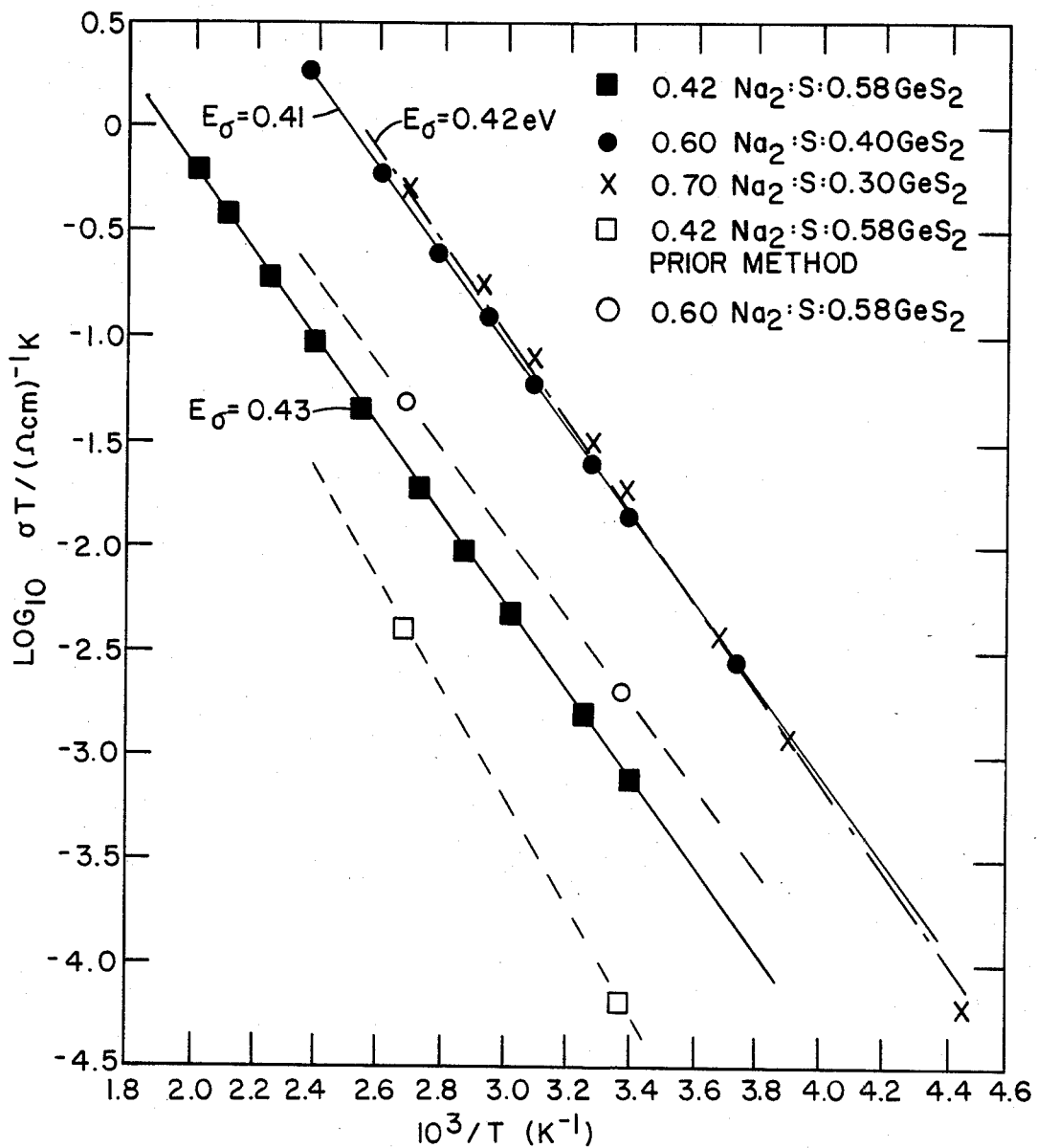
FIG. 2 is a graph showing the temperature dependance of ionic conductivity of Na$_2$S:GeS$_2$ glasses prepared by the method of the present invention and by a prior art method.
Figure 3:
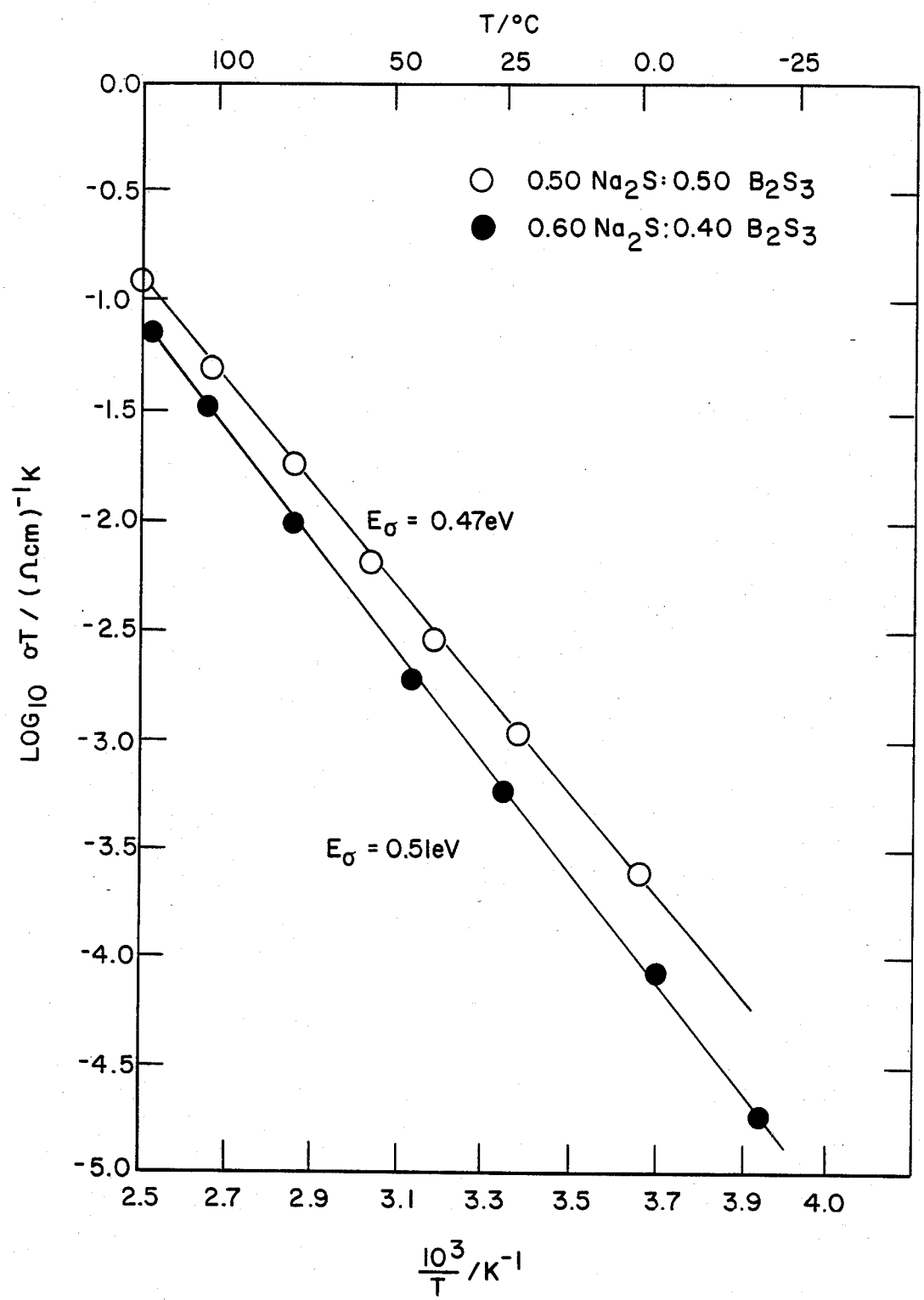
FIG. 3 is a graph showing temperature dependence of ionic conductivity for Na$_2$S:B$_2$S$_3$ glass at different compositions.

Various other samples of the $Na_2S:B_2S_3$ glasses along with other glasses of $Na_2S:GeS_2$ were prepared in a similar manner and analyzed. The resulting data were analyzed using the complex admittance diagrams to obtain ionic conductivity. All of the glasses were found to follow the Arrhenius Law yielding straight lines in plots of log $\sigma$ T versus $T^{-1}$ where T is absolute temperature and $\sigma$ is conductivity. FIGS. 2 and 3 illustrate the results at various compositions of $Na_2S:GeS_2$ and $Na_2S:B_2S_3$.

FIG. 2 also includes data obtained from Ribes et al, Journal Non-Crystalline Solids, 38-39, (1980) page 271 labeled as "Prior Method". It is seen from FIG. 2 that the new method of preparing $Na_2S:GeS_2$ glasses provides ionic conductivity greater than that of the prior method by a factor of about 7. An examination of FIG. 3 also shows ionic conductivity for the new glass described herein slightly greater than those previously obtained for the $Na_2S:GeS_2$ glasses and substantially higher than conductivities of prior oxide glasses.

It is therefore seen that the present invention provides a new glass having improved ionic conductivity over previous oxide glasses. A new method of forming reactive sulfide glasses is also disclosed that permits rapid quenching of the molten glass mixture to form amorphous glass structures prior to crystallization.

The present invention is described in terms of specific embodiments but it will be readily appreciated by those skilled in the art that various changes in materials, structure and process conditions can be made within the scope of the following claims:

The embodiments of this invention in which an exclusive property or privilege is claimed are defined as follows:

1. A method of preparing an electrically conductive glass comprising: preparing a molten mixture of an alkali metal sulfide and a non-metal sulfide compound in a substantially oxygen free atmosphere, wherein the non-metal sulfide compound is present in an amount of between about 0.3 and about 0.7 mole fraction and the alkali metal sulfide is present in an amount of between about 0.3 about and 0.7 mole fraction, the non-metal sulfide is selected from the class consisting of sulfides of boron, silicon, germanium and other elements in groups III A, IV A, and V A of the periodic table capable of serving as glass networks, pouring the molten mixture protected by the substantially oxygen free atmosphere into a mold of sufficient mass and cooling capacity to supercool the mixture to the glass transition temperature prior to crystallization to form an amorphous solid mixture of alkali metal sulfide and nonmetal sulfide capable of conducting the ion of said alkali metal.

2. The method of claim 1 wherein said mold includes a metal mass of at least 10 times the mass of the electrically conductive glass in contact therewith.

3. The method of claim 1 wherein said molten mixture is cooled from above its freezing temperature to below its glass transition temperature in less than .1 second.

4. The method of claim 1 wherein said molten mixture is cooled to below the glass transition temperature at a cooling rate of at least 500° C. per second.

5. The method of claim 1 wherein the glass formed on cooling to below the glass transition temperature is annealed at a temperature of about 30°-50° C. below the glass transition temperature.

6. The method of claim 1 wherein the glass is formed the mold in a layer of not more than 1 cm thickness.

7. The method of claim 1 wherein the electrically conductive glass includes $B_2S_3$ and $Na_2S$ in an amorphous solid mixture as a glass network former and a glass network modifier respectively.

8. A method of preparing an electrically conductive glass consisting essentially of an alkali metal sulfide and a non-metal sulfide, said method comprising preparing a molten mixture of alkali metal sulfide and non-metal sulfide in a substantially water-free and oxygen-free atmosphere wherein the non-metal sulfide compound is present in an amount of between about 0.3 and about 0.7 mole fraction and the alkali metal sulfide is present in an amount of between about 0.3 and about 0.7 mole fraction, the non-metal sulfide is selected from the class consisting of sulfides of boron, silicon, germanium and other elements in groups III A, IV A, and V A of the periodic table capable of serving as glass networks; and supercooling said molten mixture to a temperature below the glass transition temperature at a cooling rate sufficient to form an amorphous solid mixture capable of conducting alkali metal cations.

9. The method of claim 8 wherein said molten mixture comprises up to 0.7 mole fraction $Na_2S$ and the remainder $B_2S_3$.

10. The method of claim 8 wherein said molten mixture comprises up to 0.7 mole fraction $Na_2S$ and the remainder $GeS_2$.

11. The method of claim 8 wherein said mixture is cooled at a rate of more than 500° C. per second to below the glass transition temperature.

12. The method of claim 8 wherein said alkali metal sulfide is $Na_2S$ and said non-metal sulfide is $B_2S_3$ and wherein said molten mixture is heated to a temperature of about 800° to 1000° C. and cooled at a rate of more than 500° C. per second to less than about 200° C. followed by annealing at a temperature of about 170° C. for about one hour.

13. The method of claim 8 wherein said molten mixture is cooled to below its glass transition temperature at a rate of more than 500° C. per hour by contact with a mold having a mass more than ten times the mass of the mixture contacting said mold.

* * * * *